United States Patent
Drumm

(10) Patent No.: US 10,059,319 B2
(45) Date of Patent: Aug. 28, 2018

(54) ACTUATING UNIT FOR A HYDRAULIC BRAKE SYSTEM

(71) Applicant: Continental Teves AG & Co. oHG, Frankfurt (DE)

(72) Inventor: Stefan Drumm, Saulheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/304,812

(22) PCT Filed: Apr. 10, 2015

(86) PCT No.: PCT/EP2015/057861
§ 371 (c)(1),
(2) Date: Oct. 17, 2016

(87) PCT Pub. No.: WO2015/158626
PCT Pub. Date: Oct. 22, 2015

(65) Prior Publication Data
US 2017/0043756 A1    Feb. 16, 2017

(30) Foreign Application Priority Data
Apr. 15, 2014  (DE) .................. 10 2014 207 219

(51) Int. Cl.
*B60T 13/66*   (2006.01)
*B60T 7/04*    (2006.01)
*B60T 13/16*   (2006.01)

(52) U.S. Cl.
CPC ............ *B60T 13/662* (2013.01); *B60T 7/042* (2013.01); *B60T 13/162* (2013.01)

(58) Field of Classification Search
CPC ....... B60T 13/662; B60T 13/162; B60T 7/042
(Continued)

(56) References Cited

U.S. PATENT DOCUMENTS

| 4,826,255 A * | 5/1989 | Volz ............ B60T 8/4031 188/345 |
| 5,609,399 A * | 3/1997 | Feigel .......... B60T 8/3265 188/162 |

(Continued)

FOREIGN PATENT DOCUMENTS

| DE | 4310061 A1 | 9/1994 | |
| DE | 4401524 A1 * | 8/1995 | ............ B60T 8/3265 |

(Continued)

OTHER PUBLICATIONS

ISR dated Oct. 21, 2015 of corresponding PCT application PCT/EP2015/057861.

(Continued)

*Primary Examiner* — Thomas J Williams
*Assistant Examiner* — Mariano Sy

(57) ABSTRACT

An actuating unit for a brake system, comprises a pedal connection element that charges a booster piston with an actuating force. An elastically deformable reaction disk, absorbs the actuating and boosting forces of the booster and releases the sum of said forces to a working piston. An electrically controllable pressure supply device outputs pressure which acts upon the booster piston. The actuating unit further comprises an extension arm for detecting the differential path between the pedal connection element and the booster piston and a sensor device that detects the differential path. An electronic control unit receives the signals from the sensor device and uses said signals for controlling the pressure supply device. Differential path information is transported by the extension arm to a location near the sensor device that is radially and axially offset by the reaction disk.

16 Claims, 3 Drawing Sheets

(58) Field of Classification Search
USPC ............ 303/155, 113.4, 114.1, 114.3, 115.2;
188/356; 60/545
See application file for complete search history.

(56) References Cited

U.S. PATENT DOCUMENTS

| | | | | |
|---|---|---|---|---|
| 5,713,640 | A * | 2/1998 | Feigel | B60T 8/3265 303/115.2 |
| 5,853,229 | A | 12/1998 | Willmann et al. | |
| 5,873,247 | A * | 2/1999 | Schluter | B60T 7/04 60/534 |
| 8,240,780 | B1 * | 8/2012 | Klimes | B60T 8/3265 303/113.4 |
| 8,459,753 | B2 * | 6/2013 | Vollert | B60T 13/745 303/114.1 |
| 8,631,694 | B2 * | 1/2014 | Vollert | B60T 7/042 73/121 |
| 2007/0199436 | A1 * | 8/2007 | Ikeda | B60T 13/746 91/376 R |
| 2011/0120121 | A1 * | 5/2011 | Sprocq | B60T 13/162 60/563 |
| 2012/0091788 | A1 | 4/2012 | Weiberle et al. | |
| 2013/0020168 | A1 * | 1/2013 | Eich | F16D 29/005 192/85.63 |
| 2013/0127237 | A1 | 5/2013 | Pfeiffer et al. | |
| 2014/0041378 | A1 * | 2/2014 | Richard | B60T 13/686 60/545 |
| 2015/0027214 | A1 | 1/2015 | Binder | |

FOREIGN PATENT DOCUMENTS

| | | | |
|---|---|---|---|
| DE | 19604134 A1 | 8/1997 | |
| DE | 102008062864 A1 | 11/2009 | |
| DE | 102008054853 A1 | 7/2010 | |
| DE | 102010002406 A1 | 9/2011 | |
| DE | 102010040854 A1 * | 3/2012 | ............. B60T 8/267 |
| DE | 102010042363 A1 | 4/2012 | |
| DE | 102011088950 A1 | 6/2013 | |

OTHER PUBLICATIONS

DE search report dated Feb. 27, 2015 of corresponding German patent application 10 2014 207 219.0.
English Abstract of DE 10 2008 062 864 A1.
English Abstract of DE 10 2008 054 853 A1.
English Abstract of DE 10 2010 040 854 A1.

* cited by examiner

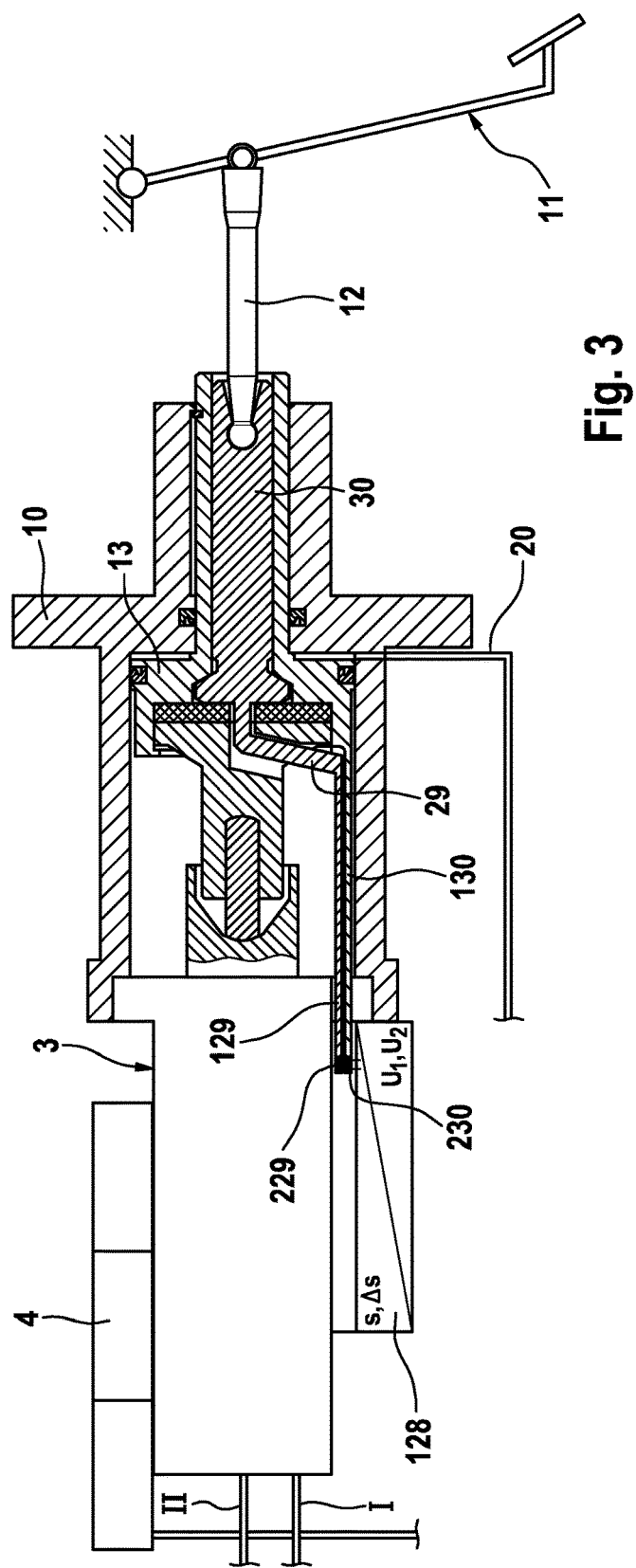

ACTUATING UNIT FOR A HYDRAULIC BRAKE SYSTEM

TECHNICAL FIELD

The present invention relates to an actuating unit for a hydraulic brake system.

BACKGROUND

An actuating unit of this type is by way of example disclosed in the patent application DE 43 10 061 A1 of the applicant. A sensor arrangement that is merely illustrated in a simplified manner is used to ascertain the differential travel between the pedal connecting element and the brake boosting piston, said sensor arrangement being arranged in the region between the brake boosting piston and a pressure rod that is jointed in an articulating manner to the actuating pedal. As an example, a Hall sensor and also a permanent magnet can be used to achieve the sensor arrangement. Further disclosures regarding the construction of the previously known sensor arrangement are not evident in the disclosure of the mentioned publication. It thus remains inter alia open as to which path is to be used for the differential travel information to pass from the previously known sensor arrangement that is localized to the moving brake boosting piston to the electronic control unit that is fixed to the brake booster housing. A corresponding flexible electrical connection that does not impair the movement of the brake boosting piston is regarded as not being feasible with the necessary functional reliability.

The therefore initially obvious approach of separately ascertaining the two distances travelled by the pedal connecting element and the brake boosting piston relative to the brake booster housing using sensor arrangements that are fixed to the housing, said sensor arrangements forming and further processing the difference of the corresponding signals, is technically problematic because the differential travel that carries the essential information is approximately two orders of magnitude smaller than the two signals that are used. If by way of example the pedal connecting element travel signal comprises a deviation of +1% of its value range and the brake boosting piston travel signal comprises a deviation of −1% of its value range, this would cause an entirely unacceptable error of 200% of the differential travel signal. One consequence of this approach would be to lead to a comparatively complex and cost-intensive solution owing to the associated accuracy that is required for the two signals.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present invention relates to an actuating unit for a hydraulic brake system having an actuating pedal, at least one operating piston of a master brake cylinder, having a brake boosting piston of a hydraulic braking force booster, said brake boosting piston being guided in a brake booster housing, so as to actuate the operating piston, having a pedal connecting element for influencing the brake boosting piston with an actuating force, a reaction disc that can be deformed in an elastic manner, said reaction disc receiving on one side the actuating force and also the brake boosting force of the braking force booster and on the other side outputting the sum of said forces to the operating piston, an electrically controllable pressure providing device, whose output pressure influences the brake boosting piston, having means for ascertaining the differential travel of the pedal connecting element and the brake boosting piston, a sensor device for ascertaining the differential travel, and also an electronic control unit that receives the signals that are output by the sensor device and uses said signals to control the pressure providing device.

One object of the present invention is therefore to improve an actuating unit of the above mentioned type in such a manner that its means for ascertaining the differential travel of the pedal connecting element and the brake boosting piston can be achieved in a constructively simple, cost-effective and yet functionally reliable manner and in so doing render it possible to achieve the measuring accuracy required for the braking force boosting function for the differential travel.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 illustrates a second embodiment of an actuating unit in accordance with the invention in a sectional view corresponding to FIG. 2.

DETAILED DESCRIPTION

Figure 1:
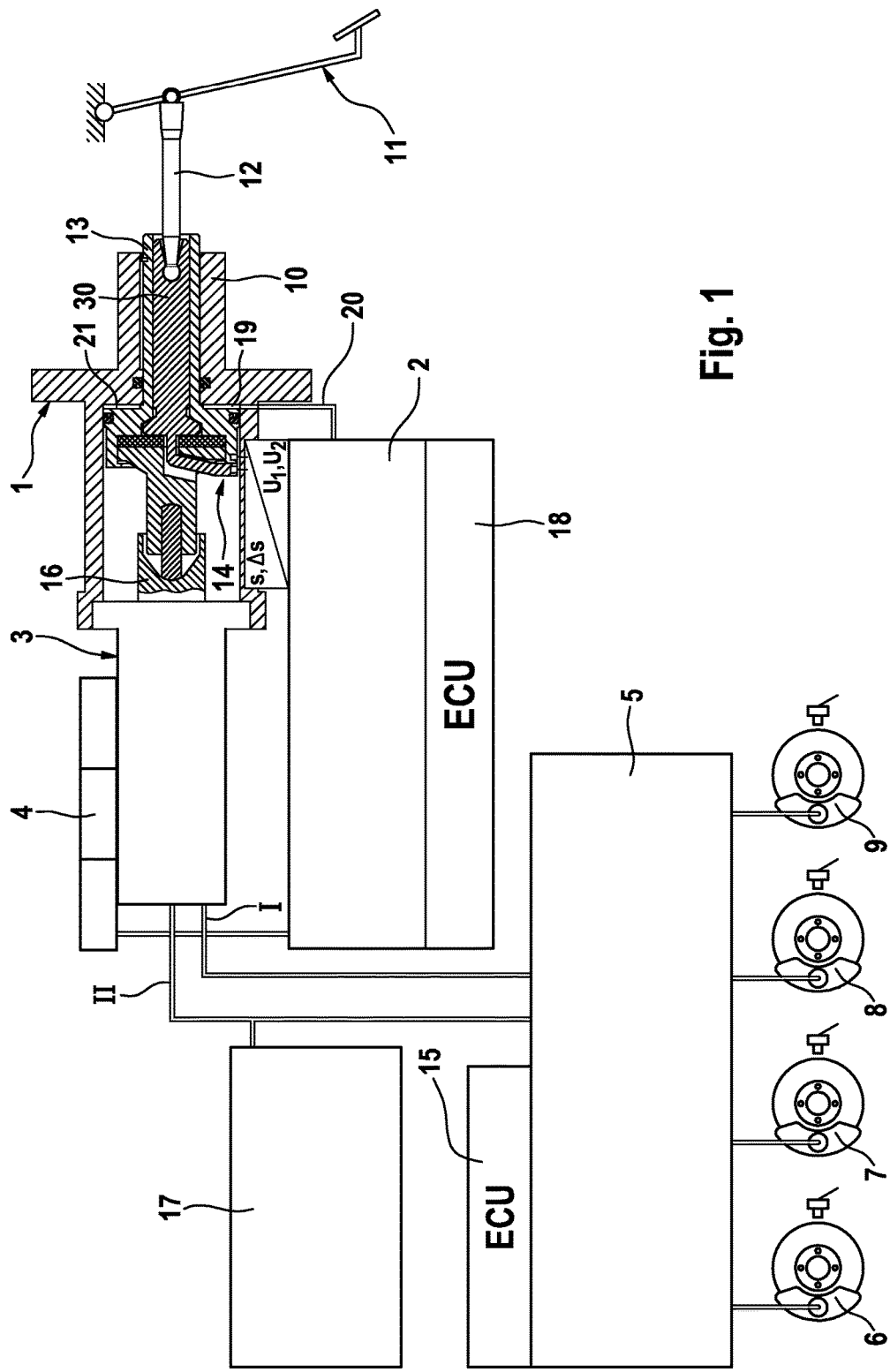
FIG. 1 illustrates a simplified hydraulic circuit diagram of a brake system for motor vehicles, said brake system being equipped with an actuating unit in accordance with the invention.

The brake system that is illustrated in FIG. 1 essentially comprises an actuating unit 1, an electrically controllable pressure providing device 2 having an allocated electronic control unit 18, wherein the actuating unit 1 and the pressure providing device 2 form an electrohydraulic braking force booster, and also a master brake cylinder or tandem master brake cylinder 3 that is operatively connected downstream of the braking force booster, and the pressure chambers (not illustrated) of said master brake cylinders can be connected to the chambers of a pressure means storage container 4 that is under atmospheric pressure. On the other side, wheel brake circuits I, II of a motor vehicle are connected to the pressure chambers, said wheel brake circuits supplying hydraulic pressure medium to the wheel brakes 6, 7, 8, 9 of the motor vehicle by means of interpositioning a known ABS hydro unit or ESP hydro unit or a controllable wheel brake pressure modulation module 5.

A second electronic control unit 15 is allocated to the wheel brake pressure modulation module 5. The actuating device 1 that is arranged in a brake booster housing 10 and to which the tandem master cylinder 3 is connected can be controlled by way of a brake pedal 11 that is operatively connected by way of an actuating rod 12 to a brake boosting piston 13 of the actuating device 1. The actuating travel of the brake pedal 11 is ascertained by means of a sensor arrangement 14 that inter alia senses the travel of the brake boosting piston 13 relative to the brake boosting housing 10. The actuating force that is applied at the brake pedal 11 and also the brake boosting force that is applied by the braking force booster 1, 2 are transferred to a first operating piston 16 of the master brake cylinder 3 by way of means whose embodiment is further explained in the text hereinunder. A brake boosting chamber 19 that is delimited by an annular operating surface 21 that is embodied on the brake boosting piston 13 in the brake booster housing 10 is connected to the pressure providing device 2 by means of a hydraulic connecting line 20. For recuperating braking procedures, a pressure means volume removing actuator can be used to represent the brake pedal sensation, said pressure means volume removing actuator being provided with the reference numeral 17.

Figure 2:
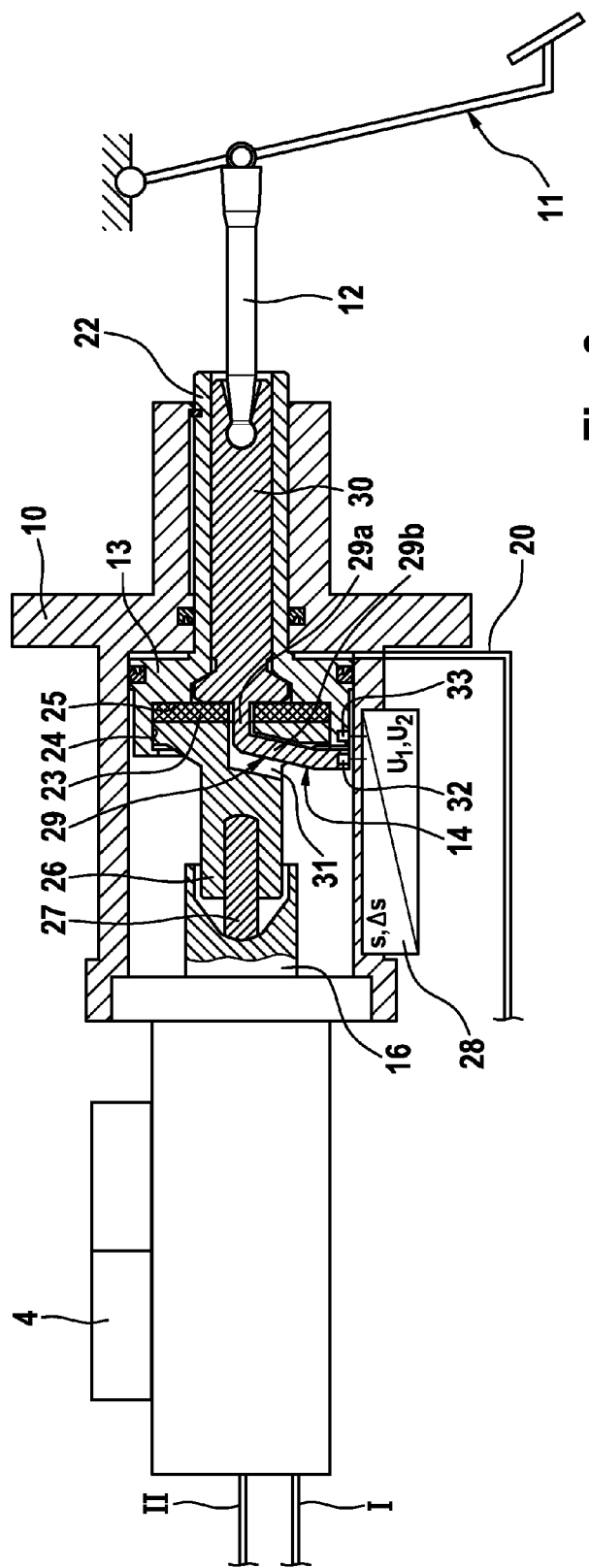
FIG. 2 illustrates a first embodiment of an actuating unit in accordance with the invention in an axial section.

As is in particular evident in FIG. 2, the actuating force that is applied to the brake pedal 11 is transferred by way of the pressure rod 12 initially to a pedal connecting element 30 that is guided in a tubular axial extension 22 of the brake boosting piston 13. The pedal connecting element 30 supports itself axially on a reaction disc 23 that can be deformed in an elastic manner and that is arranged in a cylindrical recess 24 that is embodied in the brake boosting piston 13, said reaction disc being arranged in such a manner that it lies axially on an annular surface 25 that axially delimits the recess 24. An operating piston actuating element 26 is guided in the mentioned recess 24 on the side of the reaction disc 23 that is remote from the brake pedal 11, said operating piston actuating element 26 actuating the operating piston 16 of the master brake cylinder 3 by means of interpositioning a force transferring part 27 with the sum of the forces that act upon the reaction disc 23 on the pedal side.

As mentioned above, means are provided for ascertaining the differential travel of the pedal connecting element 30 and the brake boosting piston 13, said means cooperating with a merely schematically indicated sensor device 28 and forming with said sensor device 28 the above mentioned sensor arrangement 14. In the case of the first embodiment of the invention in accordance with FIG. 2, the means comprise a cantilever 29 whose first section 29a is guided axially through an axial feedthrough in the reaction disc 23 and a second section 29b connects to said first section and said second section extends through an accordingly embodied recess 31 in the operating piston actuating element 26 and transports the travel information of the pedal connecting element 21 in the radial direction near to the sensor device 28. The transfer of the travel information between the cantilever section 29b and the sensor device 28 that is arranged in the illustrated exemplary embodiment on the brake booster housing 10 is performed without making physical contact and in the illustrated exemplary embodiment based upon the magnetic operating principle. For this purpose, the second section 29b of the cantilever 29 carries on its end or in the region of the sensor device 28 at least one magnetic element that is provided with the reference numeral 32.

At least one further magnetic element 33 is arranged in the region of the sensor device 28 in the brake boosting piston 13. In each case one magnetic element suffices if both the brake boosting piston 13 and also the pedal connecting element 30 are secured against rotation in the brake booster housing 10. As a consequence, a particularly small amount of magnetic material is required in the region of the sensor device 28. For an optimal function of the braking force booster 2, 13, 19, in addition absolute travel information is required so that the sensor device 28 also ascertains the absolute value of the distance that is travelled by the pedal connecting element 30 or by the brake boosting piston 13. Alternatively, it is also possible to ascertain the mean value from these two distances.

In the case of the second embodiment of the subject of the invention illustrated in FIG. 3, the sensor device 128 is arranged in the actuating direction behind the brake booster housing 10 of the braking force booster outside the brake booster housing 10 preferably parallel with respect to the master brake cylinder 3. The above mentioned means for transferring the linear adjustment travel information to a location near to the sensor device 128 are formed by means of two cantilevers 129, 130 that protrude from the brake booster housing 10. The first, radially inward lying cantilever 129 is attached to the pedal connecting element 30 and represents an axial extension of the cantilever 29 that is explained in connection with FIG. 2 and whose end is fitted with a first magnetic element 229. The second, radially outward extending cantilever 130 is formed by means of an axial extension of the brake boosting piston 13 whose end carries a second magnet element 230. The particular advantage of the preferably magnetic transfer of travel information that is illustrated in FIG. 3 resides in the fact that said transfer merely has to overcome one short transfer distance. Accordingly, small magnets also suffice.

As an alternative to the magnetic transfer of information, the embodiment variant in accordance with FIG. 3 is also suitable for an optical transfer of travel information. For this purpose, in lieu of the magnet elements 229, 230, optical windows are used that control luminous fluxes, which are emitted by a light source that is arranged preferably in the sensor device 128, in such a manner that by means of the sensor device 128 subsequently receiving said luminous fluxes and evaluating the intensities of said luminous fluxes that are allowed to pass through on various paths, at least the relative travel of the pedal connecting element 30 with respect to the brake boosting piston 13 is determined. In contrast to the magnetic operating principle, the process of ascertaining the travel in this manner on the basis of an optical operating principle cannot be disrupted as a result of external electromagnetic fields.

One object of the present invention is therefore to improve an actuating unit of the above mentioned type in such a manner that its means for ascertaining the differential travel of the pedal connecting element and the brake boosting piston can be achieved in a constructively simple, cost-effective and yet functionally reliable manner and in so doing render it possible to achieve the measuring accuracy required for the braking force boosting function for the differential travel.

This means comprise at least one cantilever that transports the information of the differential travel to a location near the sensor device, said location being radially and axially offset with respect to the reaction disc.

In one embodiment to implement this concept, two cantilevers are provided that extend in sections parallel to one another, said cantilevers being embodied on the brake boosting piston and also on the pedal connecting element.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. An actuating unit for a hydraulic brake system comprising:
   an actuating pedal;
   at least one operating piston of a master brake cylinder, having a brake boosting piston of a hydraulic braking force booster, said brake boosting piston being guided in a brake booster housing, so as to actuate the operating piston;
   a pedal connecting element for influencing the brake boosting piston with an actuating force;
   a reaction disc that can be deformed in an elastic manner, said reaction disc on one side receiving the actuating force and also the brake boosting force of the braking force booster and on the other side outputting the sum of these forces to the operating piston;
   an electrically controllable hydraulic pressure providing device whose output pressure influences the brake boosting piston, having an instrument for ascertaining a differential travel between the pedal connecting element and the brake boosting piston;
   a sensor device of the instrument, wherein the sensor device is secured to the brake booster housing for ascertaining the differential travel, wherein an electronic control unit receives the signals that are output by the sensor device and uses said signals to control the pressure providing device; and
   at least one cantilever by way of which at least one portion of differential travel information for ascertaining the differential travel is transported to a location near the sensor device said location being radially and axially offset from the reaction disc.

2. The actuating unit as claimed in claim 1, wherein two cantilevers that extend in sections parallel to one another are provided, said cantilevers being embodied on the pedal connecting element and also on the brake boosting piston.

3. The actuating unit as claimed in claim 1, wherein the sensor device is embodied for the purpose of ascertaining the differential travel information in a high resolution.

4. The actuating unit as claimed in claim 3, wherein the sensor device in addition to the differential travel information also ascertains a total displacement travel that is represented by means of the travel of the pedal connecting element or the brake boosting piston or their mean value.

5. The actuating unit as claimed in claim 1, wherein the transfer of the travel information from the location near the sensor device to the sensor device is performed without making physical contact.

6. The actuating unit as claimed in claim 5, wherein the contact-free transfer of the travel information uses an electric, magnetic or optical operating principle.

7. The actuating unit as claimed in claim 1, wherein the sensor device is arranged parallel to the master brake cylinder.

8. The actuating unit as claimed in claim 1, wherein the sensor device is arranged in the axial direction behind the brake booster housing.

9. The actuating unit as claimed in claim 1, wherein the cantilever for transferring the travel information of the pedal connecting element comprises a first section that axially penetrates the reaction disc.

10. The actuating unit as claimed in claim 9, wherein the cantilever comprises a second section that transports the travel information in a radial direction.

11. The actuating unit as claimed in claim 10, wherein the transfer of the sum of the forces on the operating piston occurs by means of an operating piston actuating element, wherein the second section extends in a recess of the operating piston actuating element.

12. The actuating unit as claimed in claim 1, wherein the brake boosting piston is secured against rotation relative to the brake booster housing.

13. The actuating unit as claimed in claim 12, wherein at least one anti-rotation device is embodied as a guiding arrangement of a cantilever in the axial direction.

14. The actuating unit as claimed in claim 13, wherein two anti-rotation devices are embodied as guiding arrangements of cantilevers in the axial direction.

15. The actuating unit as claimed in claim 1, wherein the pedal connecting element is secured against rotation relative to the brake booster housing or to the brake boosting piston.

16. The actuating unit as claimed in claim 1, wherein the output pressure that influences the brake boosting piston is via a hydraulic brake boosting chamber.

* * * * *